T. ALLSOP & W. W. SIBSON.
BELT SHIFTER.
APPLICATION FILED JUNE 30, 1908.
948,622.
Patented Feb. 8, 1910.
2 SHEETS—SHEET 1.
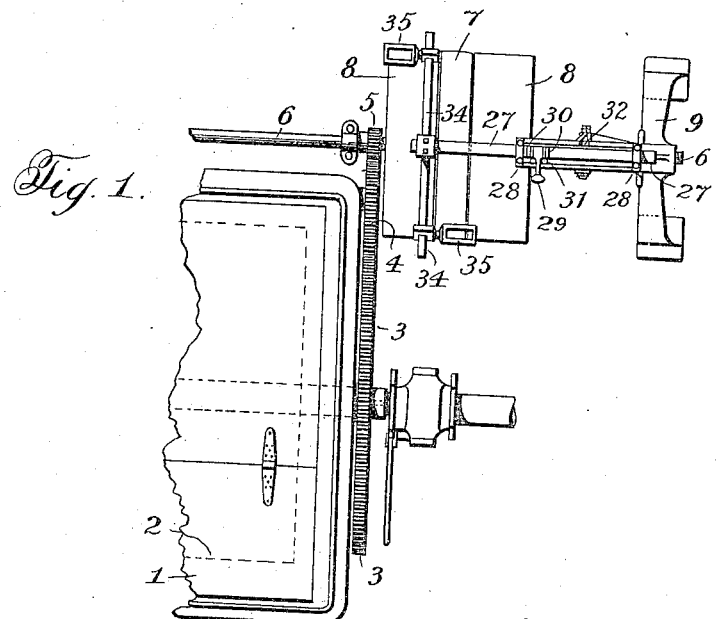
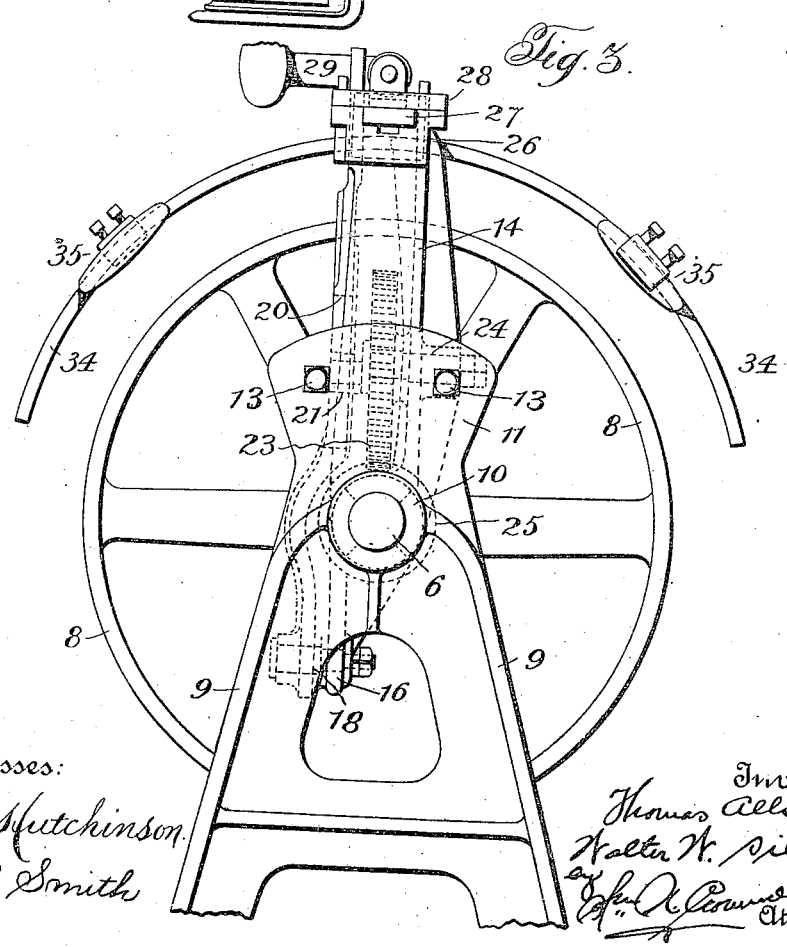
Witnesses:
Jas. E. Hutchinson
Nettie E. Smith
Inventors
Thomas Allsop and
Walter W. Sibson
by
Attorney T. ALLSOP & W. W. SIBSON.
BELT SHIFTER.
APPLICATION FILED JUNE 30, 1908.
948,622.
Patented Feb. 8, 1910.
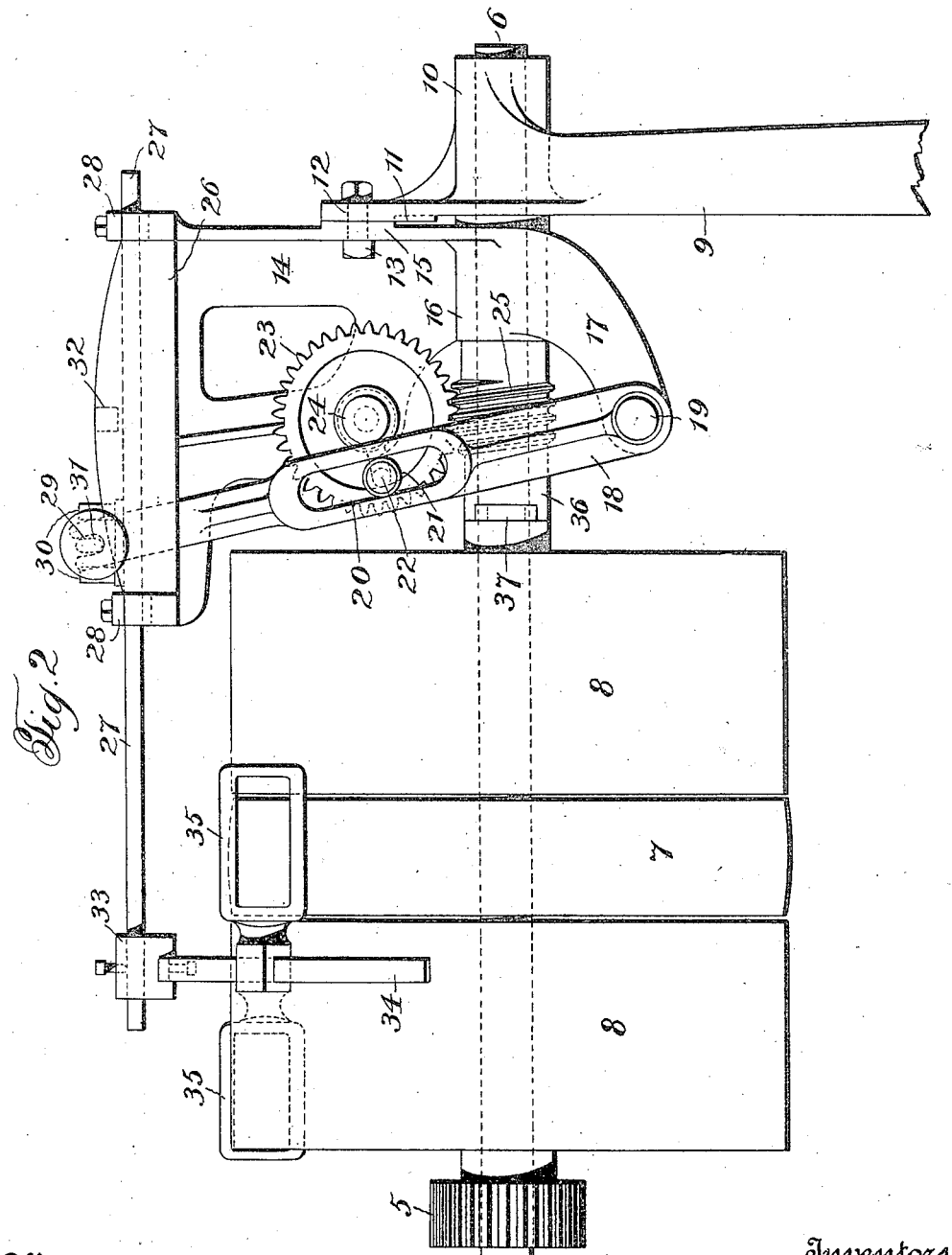

UNITED STATES PATENT OFFICE.

THOMAS ALLSOP AND WALTER W. SIBSON, OF PHILADELPHIA, PENNSYLVANIA, ASSIGNORS TO THE PHILADELPHIA DRYING MACHINERY COMPANY, OF PHILADELPHIA, PENNSYLVANIA, A CORPORATION OF PENNSYLVANIA.

BELT-SHIFTER.

948,622.

Specification of Letters Patent.

Patented Feb. 8, 1910.

Original application filed November 12, 1907, Serial No. 401,888. Divided and this application filed June 30, 1908. Serial No. 441,114.

*To all whom it may concern:*

Be it known that we, THOMAS ALLSOP and WALTER W. SIBSON, citizens of the United States, residing at Philadelphia, in the county of Philadelphia and State of Pennsylvania, have invented certain new and useful Improvements in Belt-Shifters; and we do hereby declare the following to be a full, clear, and exact description of the invention, such as will enable others skilled in the art to which it appertains to make and use the same.

This invention relates to improvements in belt shifters, and is a division of our pending application for Letters Patent Serial No. 401,888, filed November 12, 1907.

The object of the present invention is the provision of a belt shifter primarily designed for use in connection with dyeing machines of the type covered by our application above identified, although the same may be employed in connection with other machines wherein a rotatable element is given intermittent rotary movement in reverse directions, and to this end the invention contemplates a belt shifter that will automatically act upon a plurality of belts for intermittently shifting the same upon correlated tight and loose pulleys, whereby each belt will intermittently act to drive the tight pulley, and thus impart to the latter rotation in reverse directions to automatically reverse the movement of the rotatable element of the machine with which the shifter is employed.

The invention further aims to provide a belt shifter having provision for rendering the same inactive and locking the same in such position, whereby accidental shifting of the belts across the pulleys, during the period of rest of the machine with which the shifter is associated, is obviated.

Having these general objects in view, and others that will appear as the nature of the improvements is better understood, the invention consists substantially in the novel construction, combination and arrangement of parts hereinafter fully described, illustrated in the accompanying drawings, and pointed out in the appended claim.

In the drawings—Figure 1 is a top plan view of a belt shifting device constructed in accordance with the present invention, a portion of a dyeing machine being shown in connection therewith to illustrate the operative connection of the belt shifter with the machine to be driven. Fig. 2 is a side elevation of the shifter. Fig. 3 is an end elevation thereof.

Referring in detail to the drawings, and more particularly to Fig. 1, the numeral 1 designates the vat of a dyeing machine wherein is located an internal drum 2. This latter drum is driven by a gear 3 meshing with an idler gear 4, which idler gear in turn meshes with a pinion 5 that is carried by a driving shaft 6, the latter extending longitudinally of the vat 1. This is the general construction of the vat and its drive of the dyeing machine covered by our pending application Serial No. 401,888, previously mentioned hereinbefore, and while the hereindescribed belt shifter is primarily designed for use in connection with this machine, it is to be understood that the same may be employed in connection with other machines wherein a rotatable element is given intermittent rotary movement in reverse directions, the dyeing machine referred to being merely a general type of such machines.

Mounted on the shaft 6 is a tight pulley 7, and at the sides of this tight pulley are arranged loose pulleys 8.

The belt shifting device includes a floor stand 9 the upper end of which is provided with a bearing 10 that receives one end of the shaft 6. Formed adjacent to said bearing is a transversely-extending flattened head 11 having openings 12 designed to receive fastening bolts 13, and mounted upon the shaft 6 adjacent to the head 11 is a bracket 14 that has a transversely-extending flattened head 15 which bears against the head 11. Through the medium of the bolt or bolts 13 which also pass through the head 15 the bracket 14 is held in fixed relation to the head 11. The bolts 13, as will be observed, are arranged at opposite sides of the shaft 6, the heads 11 and 15 extending at opposite sides of said shaft, and said heads and bolts coöperate to anchor the bracket 14 to the support 9, thereby firmly supporting said bracket and precluding endwise thrust thereof. A sleeve 16 included as a part of the bracket 14 receives the shaft 6, and thus the bracket 14 is capable of a swinging movement upon said shaft. The purpose of this will presently appear.

Arranged at the lower end of the bracket 14 is a depending curved arm 17 to which a lever 18 is pivotally connected by means of a stud 19, and said lever 18 has at a point intermediate its ends an elongated slot 20 wherein a roller 21 carried by a stud 22 is adapted to move. The stud 22 is, in turn, carried by a worm wheel 23, said wheel being rotatably mounted upon a stud 24 connected to the bracket 14, the wheel 23 meshing with a worm 25 that is carried by the shaft 6. It will thus be seen that through the worm 25 the worm wheel 23 rotates in unison with the shaft 6, and by reason of the pivotal connection of the lever 18 with the bracket 14, and the stud and slot connection with the worm wheel 23, said lever is capable of a reciprocatory movement upon the bracket 14.

Arranged at the upper end of the bracket 14 is a guide 26 in which is slidably mounted a shifting bar 27, said bar 27 being held in the guide 26 through the medium of clamping blocks 28. A latch 29 is pivotally mounted between parallel ears 30 carried by the bar 27, and said latch is received by the upper bifurcated end 31 of the lever 18. Thus it will be seen that a detachable connection is afforded between the shifting bar 27 and the lever 18, and when the latch 29 is in the position illustrated in the drawings the bar 27 will receive reciprocatory movement in the guide 26 under the impulse of the lever 18. When, however, the latch is disengaged from said lever the latter will continue to operate, but the shifting bar 27 will remain stationary. It will be observed that the sides of the guide 26, in the zone of movement of the lever 18, are convex, and one of said sides is provided with a notch 32 into which the latch 29 may be entered should it be desired to lock the shifting bar 27 against movement.

The shifting bar 27 projects over the pulleys 7 and 8, and connected to said projecting bar is a sleeve 33 that is adjustably mounted upon the bar 27. To the sleeve 33 is connected a supporting rod 34, which rod is also adjustable in relation to the sleeve 33. At each end of the rod 34 is a belt guide 35, said guides being adjustably connected upon the bar 34, but said guides extend in opposite directions to each other. These guides are designed to each receive a separate belt (not shown) from a suitable source of power, said belts operating in reverse directions, so that when shifted to the tight pulley 7 the direction of movement thereof will be alternately reversed. The shifting of the belts in relation to the respective pulleys is effected through the medium of the worm 25, the worm wheel 23, and the lever 18 operated thereby, so that it is obvious that as the lever 18 moves to and fro the belts carried by the respective guides 35 will be alternately shifted from the loose to the tight pulleys, and impart to the internal drum 2 of the vat, or the rotatable element of the machine with which the shifter is associated, rotation in opposite directions.

Through the medium of the flattened head 11, and the ability of the bracket 14 to be swung upon the shaft 6, it will be seen that the upper end of said bracket may be moved to either side of the shaft 6, thereby positioning the belt guides 35 in different positions with respect to the periphery of the pulleys, and when so positioned the bolt or bolts 13 will hold the bracket 14 therein. This provides for the adaptation in position of the guides 35 to different angles of position occupied by the belts that furnish power to the machine.

It is to be observed that the worm 25 is carried by a sleeve 36, said sleeve being loose upon the shaft 6, and having a clutch connection 37 with the loose pulley 8 that is immediately adjacent thereto. Thus the sleeve 36 always rotates in unison with, and in the direction of movement of, the loose pulley 8 with which it has the clutched connection. Consequently, the lever 18 has a continuous reciprocatory movement, but this movement is imparted to the shifter bar 27 only when the latch 29 is engaged with the bifurcated end 31 of the lever 18. When so engaged the belt guides are shifted across the faces of the pulleys 7 and 8, but when the latch is swung out of engagement with the lever and positioned in the notch 32, the shifter bar 27 is locked against movement, and accidental shifting of the belts from the loose pulleys is thereby obviated.

It will be understood that the belt which drives the pulley 8 that is connected to the sleeve 36 always remains partially on said pulley 8 so as to continuously actuate the worm 25, the worm wheel 23, and the lever 18. This will be apparent from the position of the guide 35 which controls movement of the belt of said pulley, as illustrated in Figs. 1 and 2.

Having thus described the invention, what is claimed as new, and desired to be secured by Letters Patent, is:

In a belt shifter, the combination with a shaft, and tight and loose pulleys mounted thereon, of a support for said shaft having a transversely-extending flattened head, a bracket journaled upon said shaft and provided with a transversely-extending flattened head bearing against the flattened head of said support, fastening means carried by said flattened heads and arranged at opposite sides of said shaft, said heads and fastening means coöperating to anchor said bracket to said support and thereby preclude endwise thrust of said bracket, a guide arranged at the upper portion of said bracket, a shifter bar slidably mounted in said guide, a belt guiding device carried by said shifter bar, a lever pivotally mounted upon said bracket, connections between said shaft and said lever for reciprocating the latter, and a detachable connection between said shifter bar and said lever.

In testimony whereof we affix our signatures, in the presence of two witnesses.

THOMAS ALLSOP.
WALTER W. SIBSON.

Witnesses:
HARRY L. FENTON,
RALPH M. ERWIN.